United States Patent [19]
Loewenstein et al.

[11] Patent Number: 6,141,692
[45] Date of Patent: *Oct. 31, 2000

[54] DIRECTORY-BASED, SHARED-MEMORY, SCALEABLE MULTIPROCESSOR COMPUTER SYSTEM HAVING DEADLOCK-FREE TRANSACTION FLOW SANS FLOW CONTROL PROTOCOL

[75] Inventors: Paul Loewenstein; Erik Hagersten, both of Palo Alto, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,358

[22] Filed: Jul. 1, 1996

[51] Int. Cl.[7] .............................. G06F 12/08; G06F 15/16
[52] U.S. Cl. .................... 709/234; 709/213; 709/230; 709/212; 711/121; 711/130; 711/148
[58] Field of Search .................. 395/200.43, 200.64, 395/200.6, 200.42, 671, 672–678; 711/130, 148, 121; 709/212, 213, 230, 234, 100–106

[56] References Cited

U.S. PATENT DOCUMENTS

| | | | |
|---|---|---|---|
| 4,794,521 | 12/1988 | Zeigler et al. | 711/130 |
| 5,274,782 | 12/1993 | Chalasani et al. | 395/311 |
| 5,333,296 | 7/1994 | Bouchard et al. | 395/425 |
| 5,394,555 | 2/1995 | Hunter et al. | 711/148 |
| 5,613,071 | 3/1997 | Rankin et al. | 707/10 |
| 5,617,537 | 4/1997 | Yamanda et al. | 395/200.44 |
| 5,675,796 | 10/1997 | Hodges et al. | 395/670 |
| 5,680,482 | 10/1997 | Liu et al. | 382/233 |
| 5,710,907 | 1/1998 | Hagerston et al. | 395/475 |
| 5,740,353 | 4/1998 | Kreulen et al. | 395/183.18 |
| 5,852,718 | 12/1998 | van Loo | 709/211 |
| 5,854,906 | 12/1998 | van Loo | 710/110 |

OTHER PUBLICATIONS

Anonymous. "Combining Multiple Shared–Buffer Packet Switching Modules to Improve Switch Buffer Capacity", Internat'l Business Machines Technical Disclosure Bulletin, v. 36, n. 11, pp. 545–8, Jan. 1993.

Hwang, Kai. Advanced Computer Architecture: Parallelism, Scalability, Programmability. New York: McGraw–Hill, Inc. 1993.

Akhilesh Kumar et al., Efficient and Scalable Cache Coherence Schemes for Shared Memory Hypercube Multiprocessors, IEEE, Nov. 14, 1994, pp. 498–507.

Jeffrey Kuskin et al., The Stanford FLASH Multiprocessor, IEEE, Apr. 22, 1994, pp. 302–13.

Shubhendu S. Mukherjee et al., Coherent Network Interfaces for Fine–Grain Communication, ISCA, May 1996, pp. 247–58.

Matthias A. Blumrich et al., Virtual Memory Mapped Network Interface for the SHRIMP Multicomputer, IEEE, Apr. 18, 1994, pp. 142–53.

*Primary Examiner*—Mark R. Powell
*Assistant Examiner*—Jeffrey Allen Rossi
*Attorney, Agent, or Firm*—Holland & Hart LLP

[57] ABSTRACT

A method and apparatus are provided which eliminate the need for an active traffic flow control protocol to manage request transaction flow between the nodes of a directory-based, scaleable, shared-memory, multi-processor computer system. This is accomplished by determining the maximum number of requests that any node can receive at any given time, providing an input buffer at each node which can store at least the maximum number of requests that any node can receive at any given time and transferring stored requests from the buffer as the node completes requests in process and is able to process additional incoming requests. As each node may have only a certain finite number of pending requests, this is the maximum number of requests that can be received by a node acting in slave capacity from any another node acting in requester capacity. In addition, each node may also issue requests that must be processed within that node. Therefore, the input buffer must be sized to accommodate not only external requests, but internal ones as well. Thus, the buffer must be able to store at least the maximum number of transaction requests that may be pending at any node, multiplied by the number of nodes present in the system.

17 Claims, 6 Drawing Sheets

DIRECTORY-BASED, SHARED-MEMORY, SCALEABLE MULTIPROCESSOR COMPUTER SYSTEM HAVING DEADLOCK-FREE TRANSACTION FLOW SANS FLOW CONTROL PROTOCOL

CROSS REFERENCE TO RELATED APPLICATIONS

This patent application is related to the following, commonly assigned patent applications, the disclosures of which are incorporated herein by reference in their entirety:

1. "Extending The Coherence Domain Beyond A Computer System Bus" by Hagersten et al., filed concurrently herewith, (Reference Number P990) now, U.S. Pat. No. 5,960,179.

2. "Method And Apparatus Optimizing Global Data Replies In A Computer System" by Hagersten, filed concurrently herewith, (Reference Number P991), now U.S. Pat. No. 5,829,033.

3. "Method And Apparatus Providing Short Latency Round-Robin Arbitration For Access To A Shared Resource" by Hagersten et al., filed concurrently herewith, (Reference Number P992), now U.S. Pat. No. 5,987,549.

4. "Implementing Snooping On A Split-Transaction Computer System Bus" by Singhal et al., filed concurrently herewith. (Reference Number P993), now U.S. Pat. No. 5,978,874.

5. "Split Transaction Snooping Bus Protocol" by Singhal et al., filed concurrently herewith. (Reference Number P989), now U.S. Pat. No. 5,911,052.

6. "Interconnection Subsystem For A Multiprocessor Computer System With A Small Number of Processors Using A Switching Arrangement Of Limited Degree" by Heller et al., filed concurrently herewith. (Reference Number P1609), now U.S. Pat. No. 5,859,983.

7. "System And Method For Performing Deadlock Free Message Transfer In Cyclic Multi-Hop Digital Computer Network" by Wade et al., filed concurrently herewith, (Reference Number P1572), now U.S. Pat. No. 5,878,227.

8. "Synchronization System And Method For Plesiochronous Signaling" by Cassiday et al., filed concurrently herewith. (Reference Number P1593), now U.S. Pat. No. 5,799,175.

9. "Methods And Apparatus For A Coherence Transformer For Connecting Computer System Coherence Domains" by Hagersten et al., filed concurrently herewith, (Reference Number P1519), now U.S. Pat. No. 5,860,019.

10. "Methods And Apparatus For A Coherence Transformer With Limited Memory For Connecting Computer System Coherence Domains" by Hagersten et al., filed concurrently herewith. (Reference Number P1530), now U.S. Pat. No. 5,829,034.

11. "Methods And Apparatus For Sharing Stored Data Objects In A Computer System" by Hagersten et al., filed concurrently herewith. (Reference Number P1463), now U.S. Pat. No. 5,835,906.

12. "Methods And Apparatus For A Directory-Less Memory Access Protocol In A Distributed Shared Memory Computer System" by Hagersten et al., filed concurrently herewith. (Reference Number P1531), now U.S. Pat. No. 5,837,117.

13. "Hybrid Memory Access Protocol In A Distributed Shared Memory Computer System" by Hagersten et al., filed concurrently herewith. (Reference Number P1550), now U.S. Pat. No. 5,864,671.

14. "Methods And Apparatus For Substantially Memory-Less Coherence Transformer For Connecting Computer System Coherence Domains" by Hagersten et al., filed concurrently herewith, (Reference Number P1529), now U.S. Pat. No. 5,940,860.

15. "A Multiprocessing System Including An Enhanced Blocking Mechanism For Read To Share Transactions in A NUMA Mode" by Hagersten, filed concurrently herewith, (Reference Number P1786), now U.S. Pat. No. 5,983,326.

16. "Encoding Method For Directory State In Cache Coherent Distributed Shared Memory Systems" by Guzovskiy et al., filed concurrently herewith, (Reference Number P1520), now U.S. Pat. No. 5,752,258.

17. "Software Use Of Address Translation Mechanism" by Nesheim et al., filed concurrently herewith, (Reference Number P1560), now U.S. Pat. No. 5,897,664.

18. "Maintaining A Sequential Stored Order (SSO) In A Non-SSO Machine" by Nesheim, filed concurrently herewith, (Reference Number P1562), now U.S. Pat. No. 5,898,840.

19. "Node To Node Interrupt Mechanism In A Multiprocessor System" by Wong-Chan, filed concurrently herewith, (Reference Number P1587), now U.S. Pat. No. 5,842,026.

20. "Deterministic Distributed Multicache Coherence Protocol" by Hagersten et al., filed Apr. 8, 1996, Ser. No. 08/630,703, now U.S. Pat. No. 5,893,160.

21. "A Hybrid NUMA Coma Caching System And Methods For Selecting Between The Caching Modes" by Hagersten et al., filed Dec. 22, 1995, Ser. No. 08/577,283, now U.S. Pat. No. 5,710,907.

22. "A Hybrid NUMA Coma Caching System And Methods For Selecting Between The Caching Modes" by Wood et al., filed Dec. 22, 1995, Ser. No. 08/575,787, now U.S. Pat. No. 5,893,144.

23. "Flushing Of Attraction Memory In A Computer System" by Hagersten et al., filed concurrently herewith. (Reference Number P1416), now U.S. Pat. No. 5,893,149.

24. "Efficient Allocation Of Cache Memory Space In A Computer System" by Hagersten et al., filed concurrently herewith. (Reference Number P1576), now U.S. Pat. No. 5,893,150.

25. "Efficient Selection Of Memory Storage Modes In A Computer System" by Hagersten et al., filed concurrently herewith. (Reference Number P1726), now U.S. Pat. No. 5,802,563.

26. "Skip-level Write-through In A Multi-level Memory Of A Computer System" by Hagersten et al., filed concurrently herewith. (Reference Number P1736), now U.S. Pat. No. 5,903,907.

27. "A Multiprocessing System Configured to Perform Efficient Write Operations" by Hagersten, filed concurrently herewith. (Reference Number P1500), now U.S. Pat. No. 5,749,095.

28. "A Multiprocessing System Configured to Perform Efficient Block Copy Operations" by Hagersten, filed concurrently herewith, (Reference Number P1515), now U.S. Pat. No. 5,892,970.

29. "A Multiprocessing System Including An Apparatus For Optimizing Spin-Lock Operations" by Hagersten, filed concurrently herewith, (Reference Number P1525), now U.S. Pat. No. 5,860,159.

30. "A Multiprocessing System Configured to Detect and Efficiently Provide for Migratory Data Access Patterns" by Hagersten et al., filed concurrently herewith, (Reference Number P1555), now U.S. Pat. No. 5,734,922.

31. "A Multiprocessing System Configured to Store Coherency State within Multiple Subnodes of a Processing Node" by Hagersten, filed concurrently herewith, (Reference Number P1527), now U.S. Pat. No. 5,878,268.

32. "A Multiprocessing System Configured to Perform Prefetching Operations" by Hagersten et al., filed concurrently herewith, (Reference Number P1571), now U.S. Pat. No. 5,881,303.

33. "A Multiprocessing System Configured to Perform Synchronization Operations" by Hagersten et al., filed concurrently herewith, (Reference Number P1551), now U.S. Pat. No. 5,958,019.

34. "A Multiprocessing System Having Coherency-Related Error Logging Capabilities" by Hagersten et al., filed concurrently herewith, (Reference Number P1719), now U.S. Pat. No. 5,862,316.

35. "Multiprocessing System Employing A Three-Hop Communication Protocol" by Hagersten, filed concurrently herewith, (Reference Number P1785), now U.S. Pat. No. 5,950,226.

36. "A Multiprocessing System Configured to Perform Software Initiated Prefetch Operation" by Hagersten, filed concurrently herewith. (Reference Number P1787), now U.S. Pat. No. 5,848,254.

37. "A Multiprocessing Computer System Employing Local and Global Address Spaces and Multiple Access Modes" by Hagersten, filed concurrently herewith. (Reference Number P1784), now U.S. Pat. No. 5,887,138.

38. "Multiprocessing System Employing A Coherency Protocol Including A Reply Count" by Hagersten et al., filed concurrently herewith. (Reference Number P1570), now U.S. Pat. No. 5,897,697.

BACKGROUND OF THE INVENTION

1. Field of the Invention

This invention relates to directory-based, shared-memory, scaleable multiprocessor computer systems and, more particularly, to methods and apparatus for avoiding transaction deadlock at any node, even if transaction flow control between nodes is not implemented.

2. Description of Related Art

Computers have internal clock circuits which drive computing cycles. The faster the clock, the faster the computer can complete assigned tasks. In the early 1980s, the average clock speed of readily-available microprocessors was about 4 megahertz. In 1996, microprocessors having clock speeds over 200 megahertz are common. Clock speed increases generally follow increases in transistor density. In the past, the number of transistors per unit area has doubled every 18 months. However, processor clock speed increases attributable to increases in transistor density are expected to slow. Increased transistor density requires more effective cooling to counteract the heat generated by increased power dissipation. In addition, the need to densely pack components in order to avoid long wire lengths and associated transmission delays only exacerbates the heat problem.

Given the fundamental power dissipation problem posed by ultra-high clock speeds, scaleable, parallel computer architectures which utilize multiple processors are becoming increasingly attractive. By the term "scaleable", it is meant that multiprocessor systems may be initially constructed from a few processors, and then expanded at a later date into powerful systems containing dozens, hundreds, or even thousands of processors. Massively-parallel computers constructed from relatively-inexpensive, high-volume microprocessors are being manufactured that are capable of providing supercomputer performance. In fact, for certain applications such as data base management, multiple-processor computers systems are capable of providing performance that is vastly superior to that provided by systems constructed with a single powerful processor, in spite of the increased overhead associated with the parallel systems.

As more efficient system software is written and as parallel system architectures mature, the power and usefulness of massively-parallel computers will increase dramatically. In order to reduce the bottlenecks associated with main memory access, massively parallel systems are being manufactured and designed that distribute main memory among individual processors, or among system nodes having multiple processors. In order to speed memory accesses, each processor within a parallel system is typically equipped with a cache. It is generally conceded that the larger the cache associated with each processor, the better the system performance.

Multi-processor, multi-cache computer systems with cache-coherent memories can be based on several cache architectures such as Non-Uniform Memory Architecture (NUMA) or Cache-Only Memory Architecture (COMA). For both types of architecture, cache-coherence protocols are required for the maintenance of coherence between the contents of the various caches. For the sake of clarification, the term "cache" shall mean only a second-level cache directly associated with a processor. The term "cache memory", on the other hand, shall apply only to the main memory within a node of a COMA-type system that functions as a cache memory, to which all processors within that node have equal access, and that is coupled directly to the local interconnect.

FIG. 1 is a block architectural diagram of a parallel computer system having NUMA architecture. Computer system 100 includes a plurality of subsystems (also known as nodes) 110, 120, . . . 180, intercoupled via a global interconnect 190. Each node is assigned a unique network node address. Each subsystem includes at least one processor, a corresponding number of memory management units (MMUs) and caches, a main, a global interface (GI) and a local-node interconnect (LI). For example, node 110 includes processors 111a, 111b . . . 111i, MMUs 112a, 112b, . . . 112i, caches 113a, 113b, . . . 113i, main memory 114, global interface 115, and local-node interconnect 119.

For NUMA architecture, the total physical address space of the system is distributed among the main memories of the various nodes. Thus, partitioning of the global address (GA) space is static and is determined before at system boot-up (i.e., before the execution of application software). Accordingly, the first time node 110 needs to read or write to an address location outside its pre-assigned portion of the global address space, the data has to be fetched from a global address in one of the other subsystems. The global interface 115 is responsible for tracking the status of data associated with the address space of main memory 114. The status information of each memory location is stored as a memory tag (M-TAG). The M-TAGs may be stored within any memory dedicated for that use. For example, the M-TAGS may be stored as a two-bit data portion of each addressable memory location within the main memory 114, within a separate S-RAM memory (not shown), or within directory 116. Data from main memories 114, 124, . . . 184 may be stored in one or more of caches 113a, . . . 113i, 123a, . . . 123i, and 183a, . . . 183i. In order to support a conventional directory-based cache coherency scheme, nodes 110, 120, . . . 180 also include directories 116, 126, . . . 186 coupled to global interfaces 115, 125, . . . 185, respectively.

Since global interface 115 is also responsible for maintaining global cache coherency, global interface 115 includes a hardware and/or software implemented cache-coherency mechanism for maintaining coherency between the respective caches and main memories of nodes 110, 120, . . . 180. Cache coherency is essential in order for the system 100 to properly execute shared-memory programs correctly.

The description of a COMA-type computer system will be made with reference to FIG. 2. The architecture of a Cache-Only Memory Architecture (COMA) parallel computer system is similar in many respects to that of a NUMA system. However, what were referred to as main memories 114, 124, . . . 184 for NUMA architecture will be referred to as cache memories 214, 224, . . . 284 for COMA architecture. For a COMA system, responsibility for tracking the status of total addressable space is distributed among the respective M-TAGS and directories of the various nodes (e.g. 210, 220 . . . 280). Partitioning of the cache memories (e.g., 214, 224, . . . 284) of the COMA-type computer system 100 is dynamic. That is to say that these cache memories function as attraction memory wherein cache memory space is allocated in page-sized portions during execution of software as the need arises. Nevertheless, cache lines within each allocated page are individually accessible.

Thus, by allocating memory space in entire pages in cache memories 214, 224, . . . 284, a COMA computer system avoids capacity and associativity problems that are associated with caching large data structures in NUMA systems. In other words, by simply replacing the main memories of the NUMA system with similarly-sized page-oriented cache memories, large data structures can now be cached in their entirety.

For COMA systems, the global interface 215 has a two-fold responsibility. As in the NUMA system, it is responsible for participating in the maintenance of global coherency between second-level caches (e.g., 213a, . . . 213i, 223a, . . . 223i, and 283a, . . . 283i). In addition, it is responsible for tracking the status of data stored in cache memory 214 of node 210, with the status information stored as memory tags (M-TAGs). Address translator 217 is responsible for translating local physical addresses (LPAs) into global addresses (GAs) for outbound data accesses and GAs to LPAs for incoming data accesses.

In this implementation, the first time a node (e.g., node 210) accesses a particular page, address translator 217 is unable to provide a valid translation from a virtual address (VA) to a LPA for node 210, resulting in a software trap. A trap handler (not shown) of node 210 selects an unused page in cache memory 214 to hold data lines of the page. M-TAGs of directory 216 associated with the page are initialized to an "invalid" state, and address translator 217 is also initialized to provide translations to/from this page's local LPA from/to the unique GA which is used to refer to this page throughout the system 200.

Although a COMA system is more efficient at caching larger data structures than a cache-coherent NUMA system, allocating entire pages of cache memory at a time in order to be able to accommodate large data structures is not a cost effective solution for all access patterns. This is because caching entire pages is inefficient when the data structures are sparse or when only a few elements of the structure are actually accessed.

In order to provide a better understanding of the operation and architecture of the global interface for both NUMA-type and COMA-type systems, a description of a conventional global interface will be provided with reference to FIG. 3. When structures of FIG. 1 are referred to, the reference also applies to the corresponding structures of FIG. 2. Each global interface (e.g., GI 115 of FIG. 1 or GI 215 of FIG. 2) includes a slave agent (SA), a request agent (RA), and a directory agent (DA). Examples of such agents are SA 315a, RA 315b, and DA 315c. Each DA is responsible for maintaining its associated directory.

The status of cached copies from nodes 110, 120, . and 180 are recorded in directories 116, 126, . . . and 186, respectively. As previously explained, each copy is identified as having one of four status conditions, shared (S), owned (O), modified (M) or invalid (I). A shared state indicates that there are other copies in other nodes, that no write-back is required upon replacement, and that only read operations can be made to the location. An owned state indicates that there may be other copies in other nodes, that a write-back is required upon replacement, and that only read operations can be made to the location. A modified state indicates that there are no shared copies in other nodes and that the location can be read from or written to without consequences elsewhere. An invalid state indicates that the copy in the location is now invalid and that the required data will have to be procured from a node having a valid copy.

An RA provides a node with a mechanism for sending read and write requests to the other subsystems. An SA is responsible for responding to requests from the DA of another node.

Requests for data and responses to those requests are exchanged by the respective agents between nodes 110, 120, . . . and 180 in the form of data/control packets, thereby enabling each node to keep track of the status of all data cached therein. The status information regarding cache lines in caches 113a . . . 112i, 123a . . . 123i, and 183a . . . 183i are stored in directories 116, 126, . . . and 186, respectively. The data/control packets are transmitted between nodes via the global interconnect 190. Transmissions of data/control packets are managed through a conventional networking protocol, such as the collision sense multiple access (CSMA) protocol, under which nodes 110, 120, . . . and 180 are loosely coupled to one another at the network level of the protocol. Thus, while the end-to-end arrival of packets is guaranteed, arrival of packets in the proper order may not be. Cases of out-of-order packet arrival at nodes 110, 120, . . . and 180 may result in what are termed "corner cases". A corner case occurs when an earlier-issued but later-received request must be resolved before a later-issued but earlier-received request is resolved. If such a case is not detected and resolved in proper sequence, cache coherency may be disrupted.

Another problem related to the transmission of read and write requests is preventing system deadlock caused by more requests arriving at a node than the node can simultaneously process. Let us assume that any node acting in its capacity as a home node can process y number of home-directed requests simultaneously, and any node acting in its capacity as a slave node can process z number of slave-directed requests simultaneously. When y number of home requests are being processed by a node, that node has reached it capacity for handling home-directed requests. Likewise, when z number of slave-directed requests are being processed by a node, that node has reached its capacity for handling slave-directed requests. In other words, that node cannot begin processing other like requests until at least one of those undergoing processing is complete. If a flow control protocol were implemented which signaled the system to stop issuing transaction requests due to a destination node having reached its request processing capacity, then the global interconnect may become so overloaded with protocol transmissions that the system may reach a state where it is incapable of making any further progress. Such a state is known as system deadlock. If no flow control were implemented, protocol errors would most likely result as requests were simply dropped.

In order to manage the ongoing traffic of issued requests and responses to those requests in a parallel computing system in such a manner so as not to precipitate a condition of system deadlock caused by issuance of too many requests to a single node, system designers have heretofore relied on complex flow control protocols to manage transaction flow. Such a solution has several drawbacks. The first is the sheer complexity of designing a flawless transaction control system. The second is that a transaction control system requires overhead. Such overhead might be additional communication channels, additional memory dedicated to storing the control system software, and additional processor utilization to execute the control system software. In addition to adding to system overhead, implementation of a software-controlled traffic control system will invariably result in slower processing speeds as the system processes the traffic control parameters and implements the traffic control protocol.

What is needed is a more efficient way to manage read and write request traffic flow in a parallel computer system which does not require additional system operational overhead, and which will not impede information flow on the global interconnect.

SUMMARY OF THE INVENTION

This invention is disclosed in the context of a multi-node, cache-coherent, shared-memory, multi-processor, parallel computer system that can operate in both COMA and NUMA modes. Each node of the system has a single block of main memory to which each microprocessor within the node has equal access. For NUMA mode, the main memory block of each node represents a portion of total system physical address space. For COMA mode, memory locations can be used as a global address which identifies a home location for a global address or as a cache for data having its home in another node. Each microprocessor has associated therewith both a level-1 (L1) and a level-2 (L2) cache, each of which has a plurality of cache lines, each of which is sized to store data from a single main memory address. Only the level-2 caches are depicted.

A portion of the main memory block of each node is set aside as a cache line status directory. Alternatively, the cache line status directory may be stored in a memory separate from the main memory block. For each cache line address within each process-associated cache within that node, the directory stores data which provides information related to cache coherency.

Each processor is coupled through its L2 cache to both the main memory block and to a system interface through a local interconnect or bus. The system interface of each node is coupled to the system interface of each of the other nodes via a highly-parallel global interconnect.

Each system interface includes a directory agent that is responsible for maintaining its associated cache line status directory by updating the status of data from each main memory address that is copied to a cache line in its own node (the home node) or in any other node. Each system interface also includes a slave agent that is responsible for responding to requests from the DA of another node, as well as a request agent that provides the node with a mechanism for sending read and write requests to the other subsystems. The system interface is also responsible for maintaining the coherency of data stored or cached in the main memory, whether operating in NUMA or COMA mode. Thus each address also stores a two-bit data tag that identifies whether data at the location has an S state, an O state, an M state or an I state.

Requests for data and responses to those requests are exchanged by the respective agents between nodes in the form of data/control packets, thereby enabling each node to keep track of the status of all data cached therein. These data/control packets are transmitted between nodes via the global interconnect under the management of a transmission protocol.

The present invention provides a method and apparatus which eliminates the need for an active traffic control system, while still maintaining ordered request-related transactional flow. This is accomplished by determining the maximum number of requests that any agent at each node can receive at any given time, providing an input buffer ahead of each such agent, respectively sized to temporarily store at least the maximum number of requests that the agent can receive at any given time, and then transferring stored requests from the buffer as the agent completes requests in process and is able to process additional incoming requests. As each node may have only a certain finite number of pending requests, this is the maximum number of requests that can be received by a node acting as a responder to another node acting in requester capacity. In addition, each node may also issue requests that must be processed within that node. Therefore, the input buffer must be sized to accommodate not only external requests, but internal ones as well.

In another embodiment of the invention, which relates to coherent-cache, multi-node, parallel computer systems which may have one or more input/output (I/O) caches at each node, transactions destined to I/O devices are queued separated from transactions related to cache coherency, and the processing of cache coherency transactions is never required to wait for the processing of I/O-related transactions. Such a technique permits coherent direct memory access by I/O devices.

PREFERRED EMBODIMENT OF THE INVENTION

Figure 1:
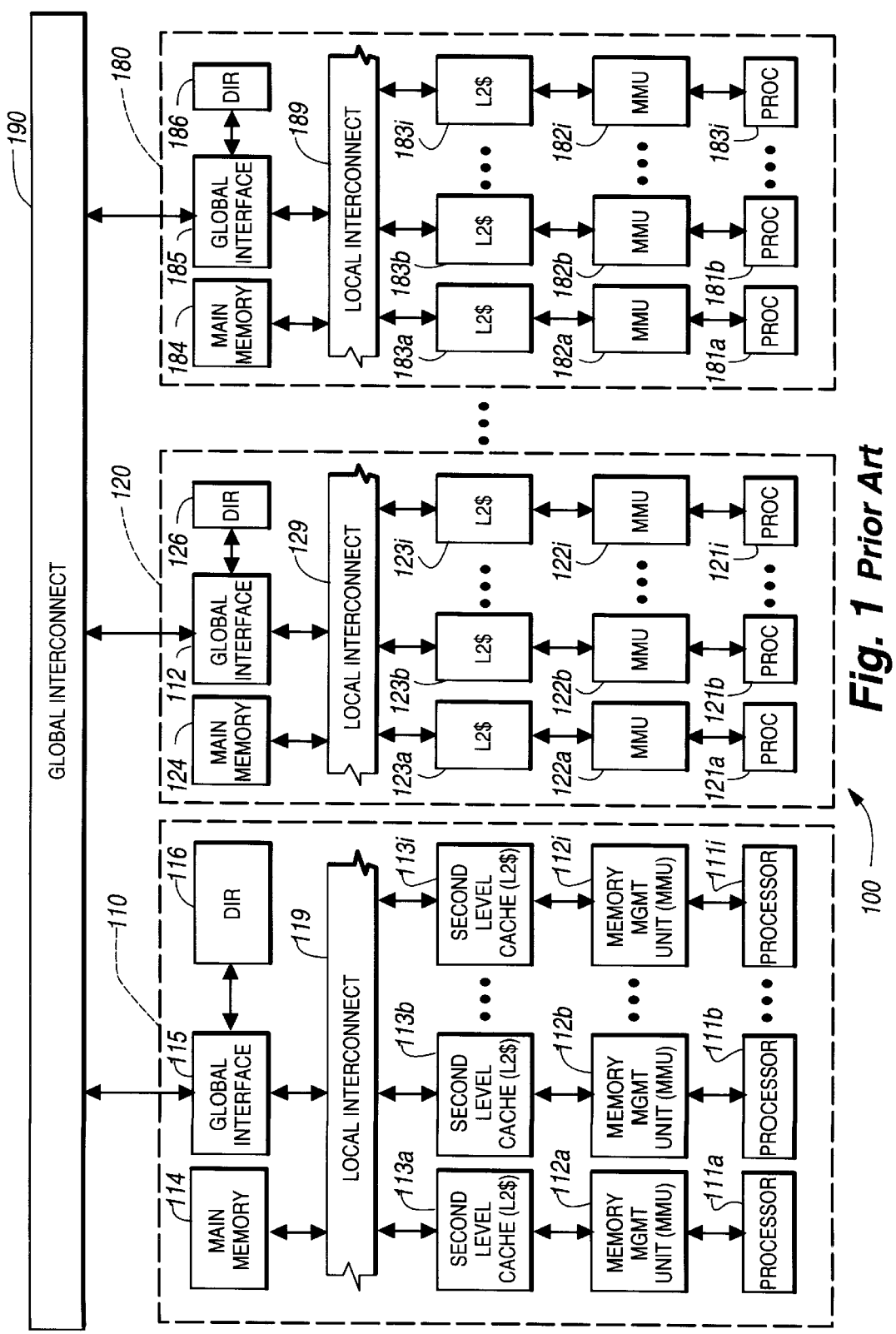
FIG. 1 is a block architectural diagram of a conventional NUMA parallel computer system.
Figure 2:
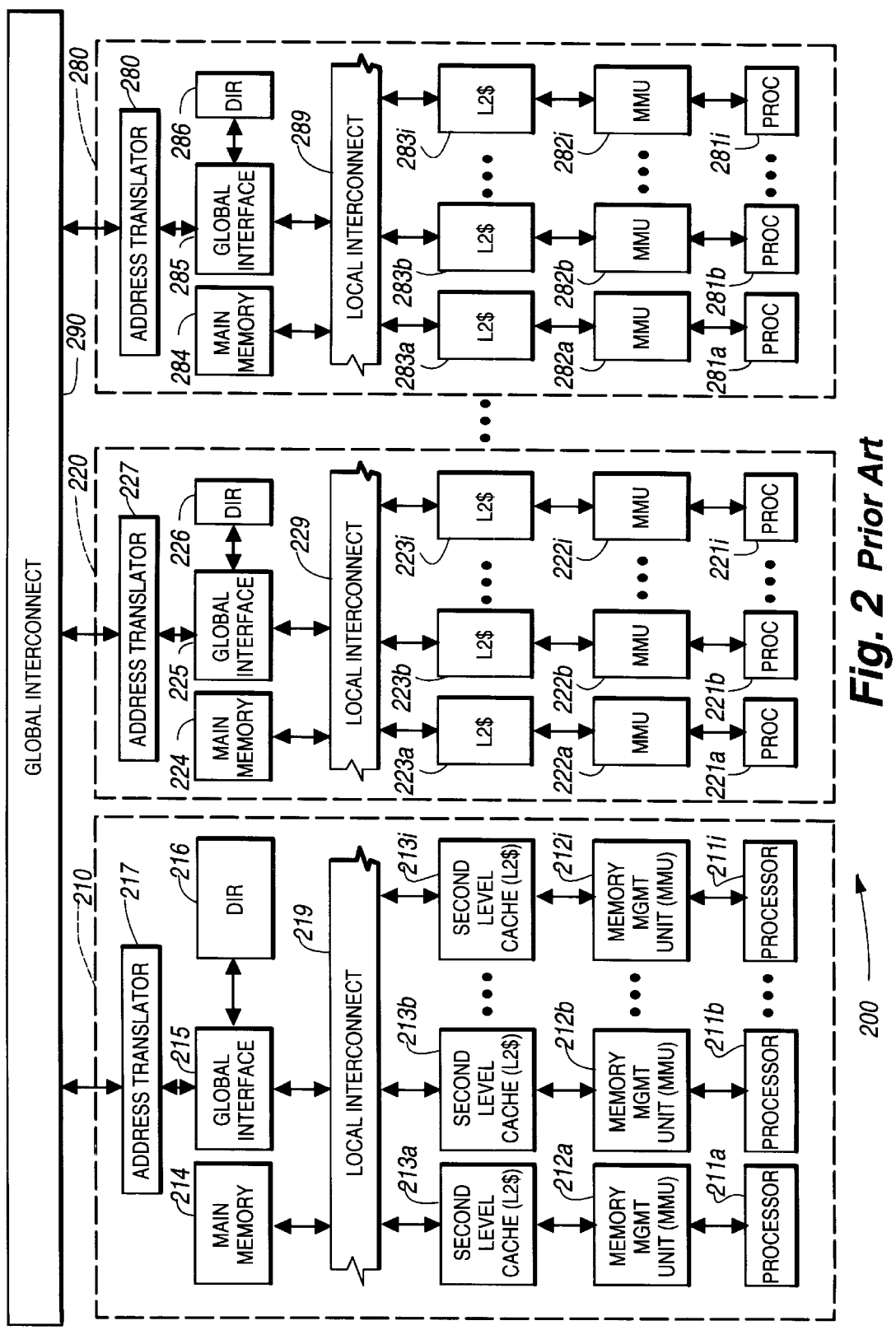
FIG. 2 is a block architectural diagram of convention COMA parallel computer system.
Figure 3:
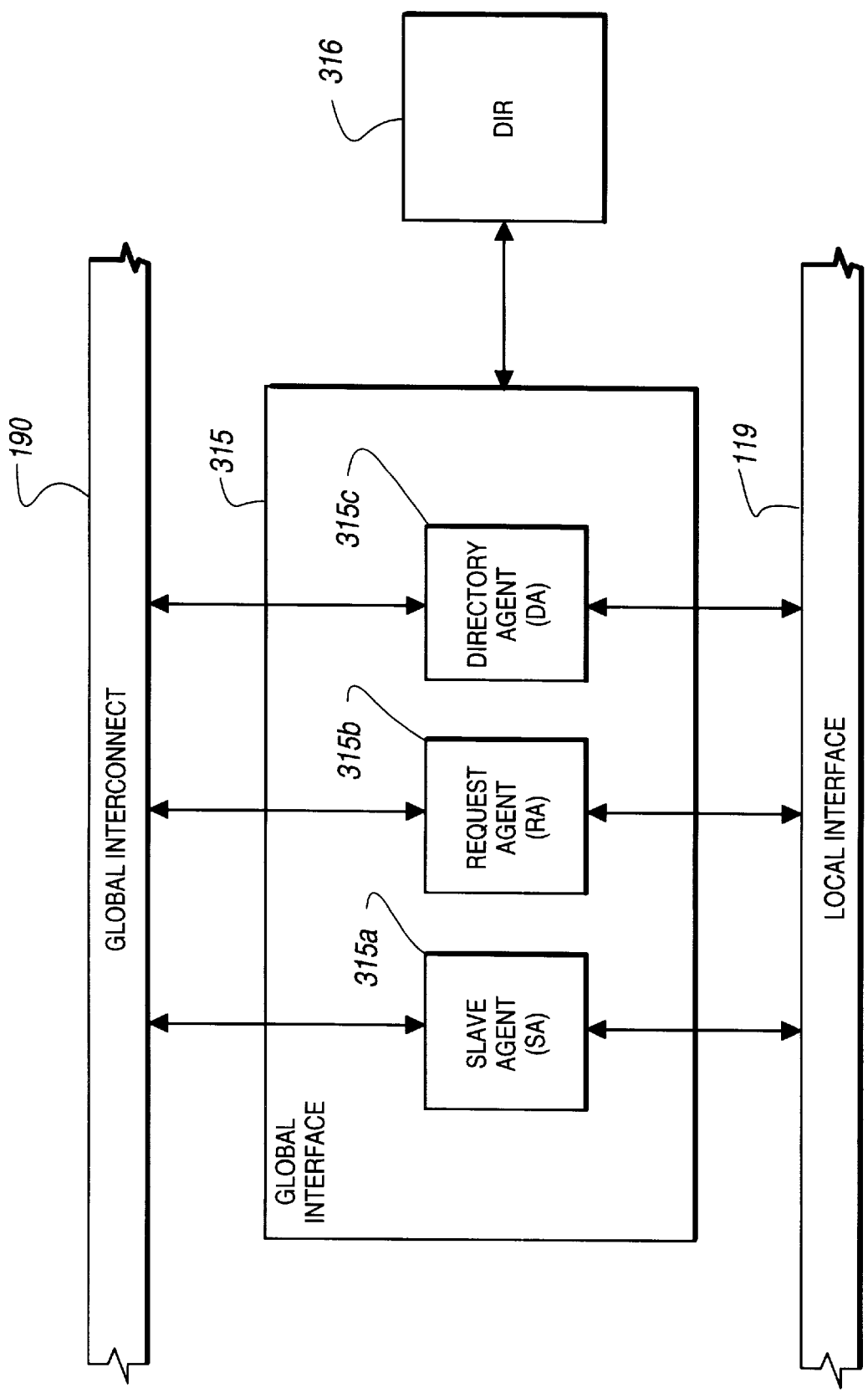
FIG. 3 is a block diagram of a conventional global interface unit.

The present invention will be described in the context of a scaleable, multi-node, directory-based, cache-coherent, shared-memory, parallel computer system which incorporates multiple Sparc® microprocessors. In this system, individual nodes can operate in both Non-Uniform Memory Architecture (NUMA) and Cache-Only Memory Architecture (COMA) modes simultaneously. When operating in the NUMA mode, the main memory represents a portion of total system physical address space. For COMA mode, memory locations can be used as a global address which identifies a home location for a global address or as a cache for data having its home in another node. Although each microprocessor within a node has associated therewith both a level-1 (L1) and a level-2 (L2) cache, only the level-2 caches are depicted in the drawings.

Figure 4:
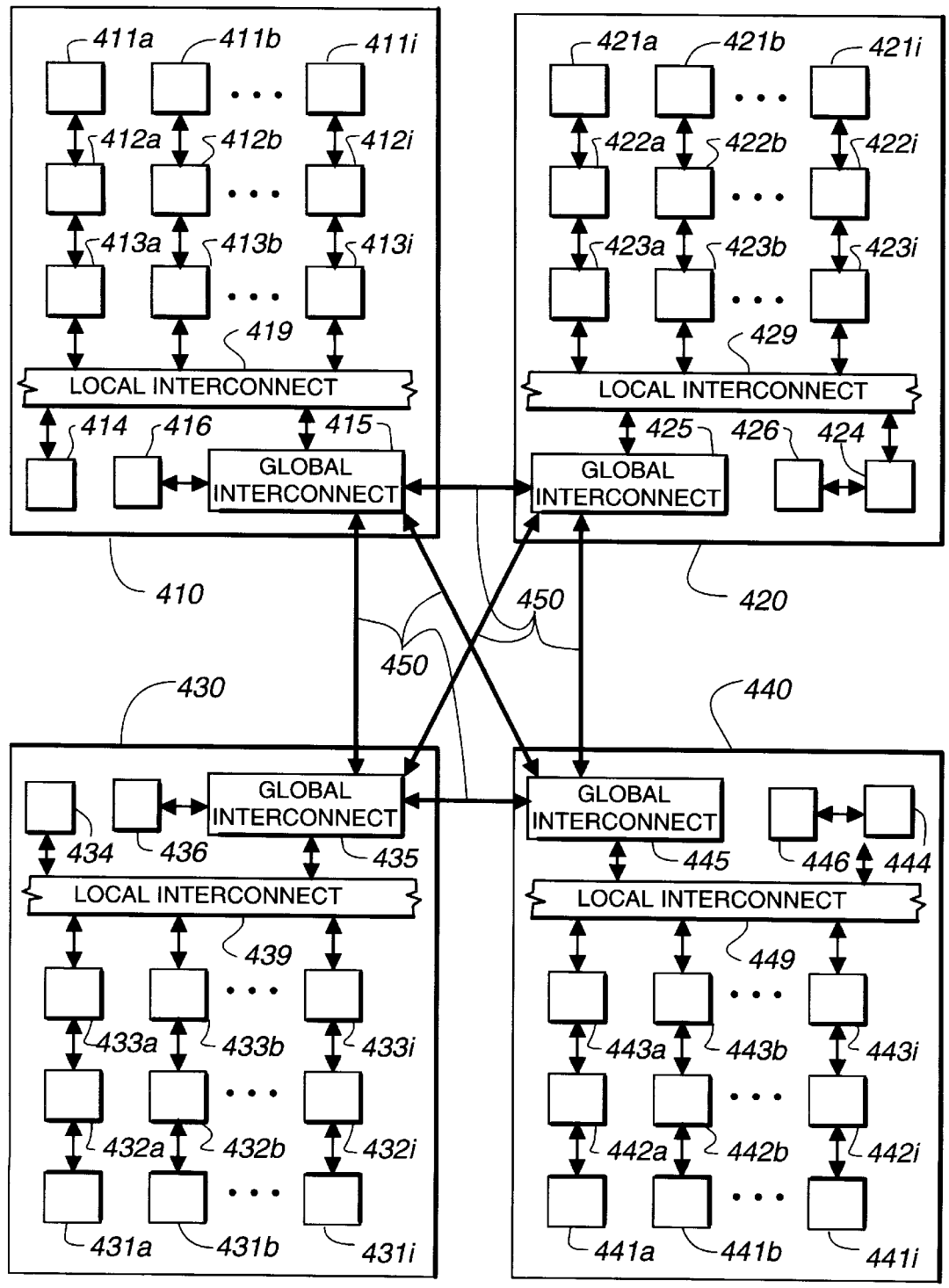
FIG. 4 is a block architectural diagram of a directory-based, shared-memory, multi-nodal, multi-processor computer system which incorporates the invention.

Referring now to FIG. 4, the architecture of the parallel computer system 40 incorporating the invention is characterized by multiple subsystems (also known as nodes) 410, 420, 430 and 440. The various nodes 410, 420, 430, and 440 are interconnected via a global interconnect 450. Although a system having only four nodes is depicted, the invention is applicable to systems having any number of interconnected nodes. Each node is assigned a unique network node address. Each node includes at least one processor, a corresponding number of memory management units (MMUs) and caches, a main memory assigned a portion of a global memory address space, a global interface (GI) and a local-node interconnect (LI). For example, node 410 includes processors 411a, 411b . . . 411i, MMUs 412a, 412b, . . . 412i, cache memories 413a, 413b, . . . 413i, main memory 414, global interface 415, and local-node interconnect 419.

Data from main memories 414, 424, 434 . . . 484 may be stored in one or more of caches 413a, . . . 413i, 423a, . . . 423i, and 483a, . . . 483i. Thus coherency between caches 413a, . . . 413i, 423a, 423i, and 483a, . . . 483i must be maintained in order for system 40 to execute shared-memory programs correctly.

In order to support a directory-based cache coherency scheme, nodes 410, 420, 430 and 440 also include directories 416, 426, 436, and 446 which are coupled to global interfaces 415, 425, 434, and 445, respectively.

Figure 5:
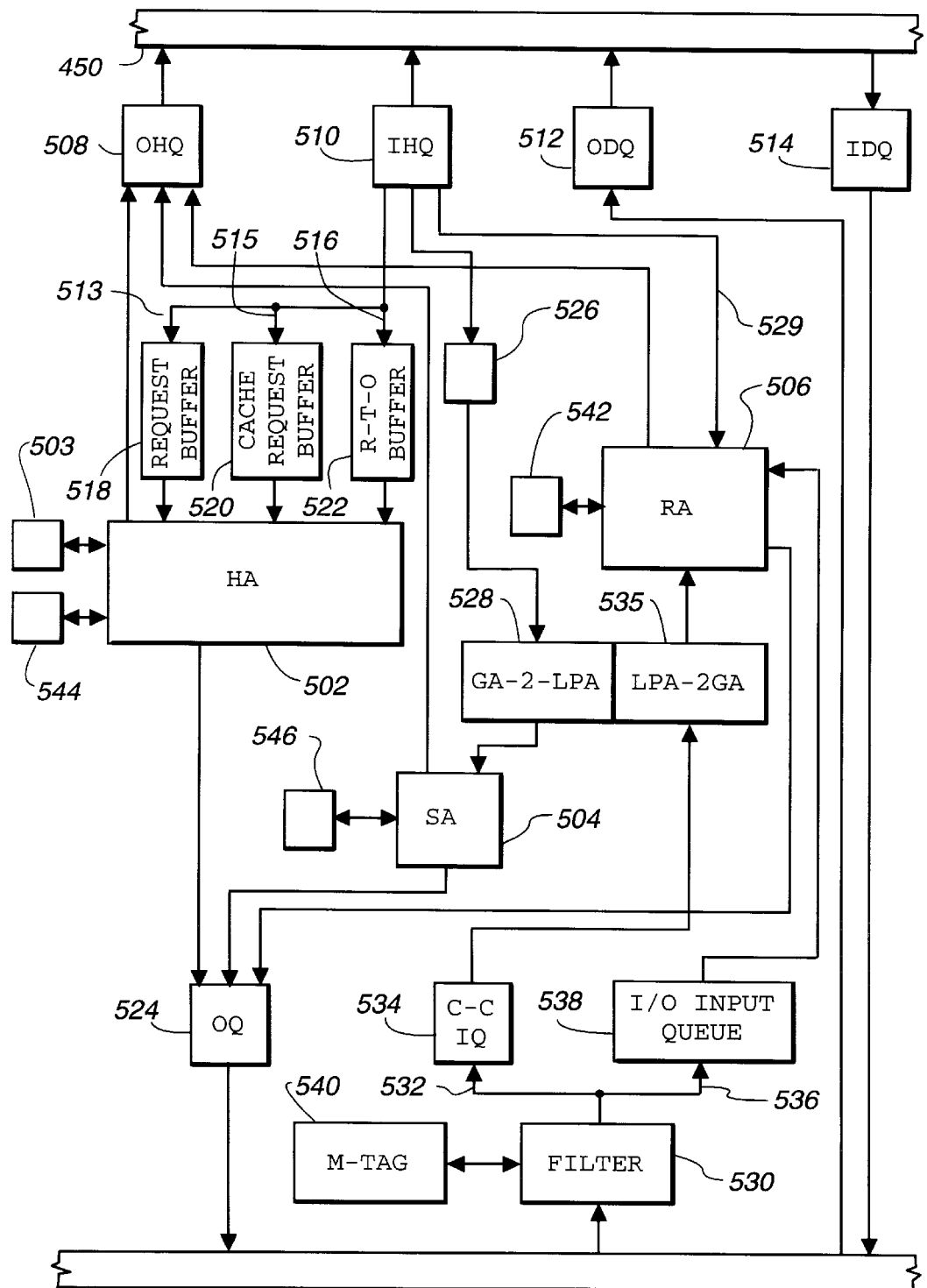
FIG. 5 is a block diagram of the new global interface unit, which incorporates the invention.
Figure 6:
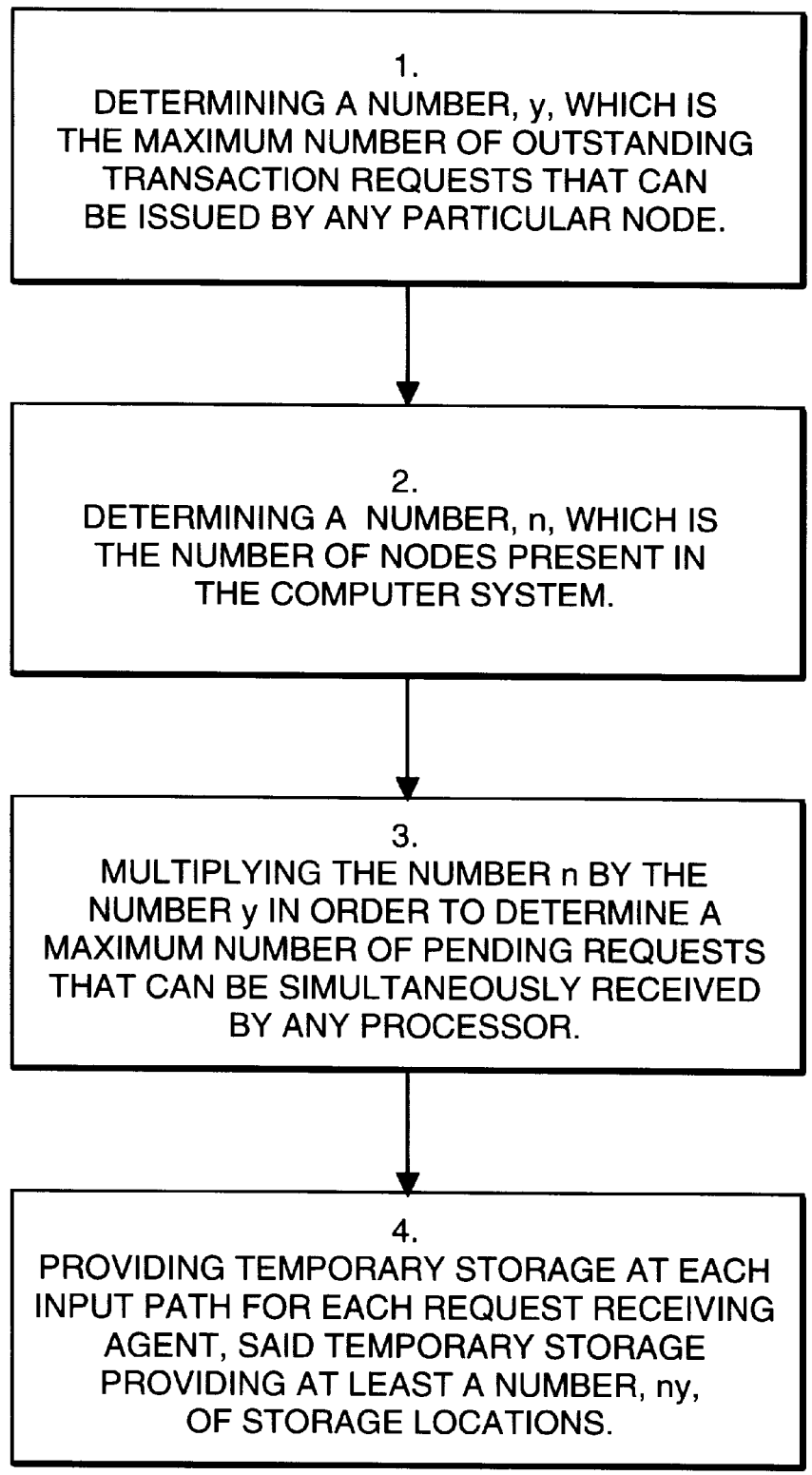
FIG. 6 is a listing of the steps involved in the method for preventing system deadlock in the absence of an active traffic control system.

Referring now to the block diagram of FIG. 5, each global interface (i.e., items 415, 425, 435, and 445 of FIG. 4) includes a home agent (HA) 502, a slave agent (SA) 504, and a request agent (RA) 506. The HA 502 is responsible for maintaining its associated directory 503 (directory 503 corresponds to either item 416, 426, 436 or 446 of FIG. 4) by updating the status of data from each main memory address that is copied to a cache line in its own node (the home node) or in any other node.

The status of all exportable locations from a home node (i.e., those which may be cached in other nodes) are maintained in a directory 508. For the system depicted in FIG. 4, directory 508 may correspond to either directory 416, 426, 436, or 446. Each copy is identified as having one of four status conditions: A shared state indicates that there are other copies in other nodes, that no write-back is required upon replacement, and that only read operations can be made to the location; an owned state indicates that there may be other copies in other nodes, that a write-back is required upon replacement, and that only read operations can be made to the location; a modified state indicates that there are no shared copies in other nodes and that the location can be read from or written to without consequences elsewhere; and an invalid state indicates that the copy in the location is now invalid and that the required data will have to be procured from a node having a valid copy (i.e., a node where the copy is identified as S, O, or M).

The SA 504 is responsible for responding to requests from the DA of another node, while the RA 306 provides a node with a mechanism for sending read and write requests to the other subsystems.

Still referring to FIG. 5, the global interface also includes an output header queue (OHQ) 508 and an input header queue (IHQ) 510. Headers contain information other than data related to a read or write request (e.g. an address for a read request). The global interface also includes output data queue (ODQ) 512, and an input data queue (IDQ) 514.

The HA 502 is coupled to the global interconnect 450 via OHQ 508. The global interconnect 450 is coupled to the HA 502 via IHQ 510 and through a first path 512 for I/O requests, a second path 514 for cache coherency requests, and a third path 516 for request-to-own (i.e., write request) transactions, respectively. Path 513 incorporates an I/O request buffer 518, path 515 incorporates a cache coherency request buffer 520, and path 516 incorporates R-T-O buffer 522. The HA 502 also sends addresses to an address bus portion (not shown) of local interconnect (e.g., item 219 of node 210) via output queue (OQ) 524.

The SA 504 is coupled to global interconnect 450 via OHQ 508. The global interconnect 450, on the other hand, is coupled to the SA 504 via IHQ 510, slave request buffer 526, and global address-to-local physical address translator 528, respectively. The SA 504 sends addresses to the address bus portion of the local interconnect (e.g., item 419 of node 410) via OQ 524.

The RA 506 is coupled to global interconnect 450 via OHQ 508. The global interconnect 450 is coupled to RA 506 via IHQ 510 via path 529, through which RA 506 receives replies of request compliance from all other nodes. RA 506 sends addresses to the address bus portion of local interconnect (e.g., item 419 of node 410) via OQ 524. The RA 506 receives addresses from the address bus portion of the local interconnect via either of two paths, both of which pass through transaction filter 530. Cache coherency transactions are routed through a first path 532 thorough local interconnect C—C input queue 534 and local physical address-to-global address translator 535, while input/output transactions are routed through a second path 536 through I/O input queue 538. The transaction filter 530 distinguishes between all other transactions on the local interconnect and those which are to be routed to the RA 506. An M-TAG SRAM memory 540 stores a multi-bit entry for each cache line address within the node associated with a particular global interface. Each entry indicates whether permission is granted to read or write to the respective cache line.

Still referring to FIG. 5, a data bus portion (not shown) of the local interconnect is coupled to the global interconnect 450 via ODQ 512, IDQ 514.

Requests for data and responses to those requests are exchanged between nodes by the respective HA, SA, and RA of each global interface (i.e., 415, 425, 435, and 445) in the form of data/control packets, thereby enabling each node to keep track of the status of all data cached therein. The status information regarding cache lines in cache memories 413a . . . 413i, 423a . . . 423i, 433a . . . 433i, and 443a . . . 443i are stored in directories which are associated with the global interface. Alternatively, the directories may be a partitioned portion of main memory (e.g., 414, 424, 434, and 444) or the directory may be extra-nodal. The data/control packets are transmitted between nodes via the global interconnect 450. Transmissions of data/control packets are managed through a networking protocol. In one implementation of the disclosed system, a blocker is associated with the home agent of each global interface. Each blocker is charged with the task of blocking new requests for a cache line until an outstanding request for that cache line has been serviced.

When the system is operating in NUMA mode, a typical read request (e.g., a Read_To_Share request) by processor 411a of node 410 occurs in the following manner. To initiate the request, processor 411a presents a virtual address (VA) to MMU 412a, which converts the VA into a GA and presents the GA to cache 413a. If there is a valid copy of the data line of interest in cache 413a (e.g., a shared or owned copy), then cache 413a provides the data to processor 411a via MMU 412a, thereby completing the read request.

However, if cache 413a does not have a valid copy, then cache 413a presents the GA to the local interconnect 419 of its associated node. If the GA is not part of the node 410's local address space (i.e., node 410 is not the home node for the requested address), then the request is forwarded to the appropriate home node (i.e., node 420). In this case where requested data cannot be found in the cache of the requesting node 410, the home directory of either node 410 or 420 (416 and 416, respectively) is updated to reflect the transaction. This is done, for example by updating directory 416 to indicate that node 410 is a sharer of the data line obtained from node 420.

If requesting node 410 is the home node for the requested data line, the corresponding M-TAG in directory 416 is checked for an appropriate M-TAG state (e.g., modified, owned, or shared) for a read step. If the M-TAG state is invalid, or if requesting node 410 is not the home node, directory 426 is checked for an appropriate M-TAG state. The directory of the home node has information about which nodes have valid copies of the data line and which node is the owner of the data line. It should be noted that the home node may or may not be the owner node. This would occur if the data line were updated within an other node, which would require a write-back to the home node before the updated line is overwritten. In addition, if the requesting node is also the home node, then the M-TAG states will provide an indication as to whether the transaction is permitted (i.e., the home directory does not need to be involved in the particular transaction).

If the home node is determined to have a valid copy of the requested data line, then the home node provides the data to the requesting node. In the case where the requesting node is also the home node, only an internal data transfer is required. Alternatively, where the home node is not the requesting node, then the global interface of the home node (global interface 425 in the above example) responds by retrieving the requested data line from the main memory 424 or from a cache line which is owned by a processor within node 420, and sends the data line to the global interface 415 of the requesting node 410 via global interconnect 450.

Conversely, if the home node does not have a valid copy of the data line (i.e., the home node is not the owner node), then the reqd request with the GA is forwarded to the global interface of the node that is the owner of the requested data line (e.g., global interface 445 of owner node 440). Global interface 445 responds by retrieving the data line from one of the caches within node 440 (e.g. owner cache 443a), and sending the data line to the global interface 415 of requesting node 410 via global interconnect 450.

Upon receiving the data line, global interface 415 forwards the data line to cache 413a, which provides the data to the requesting processor 411a. The data line can be cached in cache in the cache off the critical path for subsequent retrieval by processor 411a.

When a location in a cache (e.g., cache 413a) is needed for storing another data value, the old cache line must be replaced. Generally, cache lines having a shared state are replaced "silently" (i.e., replacement does not generate any new transactions in the computer system 400). In other words, for the above example, node 410 remains identified as a sharer of the replaced cache line in the home directory of the node where the cache containing the retrieved data line resides. Conversely, replacement of cache lines having either an owned or modified state will generate a write-back transaction to the GA of the main memory of the home node for the data being replaced. In such a case, the home directory where the write-back operation is performed must be updated to reflect this transaction.

In addition to maintaining a separate directory at each node for providing cache coherency, each GA location in main memory which, incidentally, corresponds to the length of a cache line, has associated therewith a two bit data tag which utilizes the same state identifiers as the cache directory. That is to say, that each memory location stores two bits which identify the location as S, O, M or I. This is necessary because the main memory in a particular node may also store a copy of data found at main memory locations within other nodes.

When the system is operating in COMA mode, a typical read request (e.g., a Read_To_Share request) by processor 411a of node 410 occurs in the following manner. To initiate the process, processor 411a presents a VA to MMU 412a which converts the VA into an LPA and presents the LPA to cache 413a. If there is a valid copy of the requested data line in cache 413a (i.e., a shared, owned or modified copy), then cache 413a provides the data to processor 411a, and the read request is completed.

In, on the other hand, cache 413a does not have a valid copy of the requested data line, then cache 413a presents the LPA to global interface 415. Global interface 415 accesses the M-TAGs of directory 416 to determine if a valid copy of the data line can be found in cache memory 414.

If such a valid copy is found in cache memory 414, the data line is retrieved therefrom. The data line is then provided to cache 413a, which provides the data to processor 411a via MMU 412a, thereby completing the read request.

However, if a valid copy of the requested data line cannot be located in either cache 413a or in cache memory 414, the local physical address-to-global address translator (see item 535 of FIG. 5 for details) within the global interface of the requesting node 410 converts the LPA to a GA before sending the data request via global interconnect 450 to the home sub-system whose address space includes the GA of the requested data line. Next, the global address-to-local physical address translator (see item 528 of FIG. 5 for details) within global interface 425 of home node 420 converts the GA into an LPA, and looks up the appropriate directory entry to determine if there is a valid copy of the data line in home cache memory 424. This GA-to-LPA translation in home node 420 can be a trivial operation, such as stripping an appropriate number of most significant bits from the GA.

In each of the above cases where the requested data line is not found in requesting node 410, home node 420 updates its home directory 426 to reflect a new sharer of the data line.

If a valid copy exists in home node 420, global interface 425 responds by retrieving the data line from cache memory 424 or cache 423a before sending the requested data line to global interface 415 of requesting node 410 via global interconnect 450.

Conversely, if home node 420 does not have a valid copy of the data line, then the read request with the GA is forwarded to the address translator of the owner node (e.g., the address translator within global interface 445 of node 440). Upon receiving the GA from home node 420, address translator at node 440 converts the GA into an LPA for global interface 445. This GA to LPA translation in owner node 450 is not a trivial operation. Next, global interface 445 of owner node 440 responds by retrieving the data line from either cache memory 444 or one of caches 443a, 443b, . . . 443i, and sending the requested data line to global interface 415 of requesting node 410 via global interconnect 450.

When the data line arrives at global interface 415, global interface 415 forwards the data line to cache 413a, which then provides the data to requesting processor 411a. The data line can be cached in cache 413a off the critical path for subsequent retrieval by that processor, thereby completing the read transaction. It will be noted that a GA-to-LPA translation is not required for returning data.

Occasionally, replacement of entire pages stored in cache memory 414 may be needed if cache memory 414 becomes full or nearly full, in order to make room for allocating new page(s) on a read request. Ideally, node 410 maintains an optimum amount of free pages in cache memory 414 as a background task, ensuring that the attraction memory (i.e., cache memory 414) does not run out of storage space. Upon replacement, a determination is made as to which of the cache lines of the to-be-replaced page contains valid data (either M, O or S state) by accessing the M-TAGs stored in directory 416. A message is then sent to the home directory responsible for each such line, informing it that the cache line is to be replaced.

If the cache line has an M or O state, this transaction is handled similarly to a write-back transaction in NUMA mode: the date value is written to the home cache memory or the home system. If the cache line has an S state, the replacement transaction does not transfer any data, but updates the local directory to reflect the fact that its node no longer contains a shared copy of the data line. Hence, when operating in COMA mode, replacement is not "silent", since the respective directory is continually updated to reflect any replacements of the data lines.

The present invention provides a method and apparatus which eliminates the need for an active traffic control system, while still maintaining ordered request-related transactional flow. This is accomplished by determining the maximum number of requests that any node can receive at any given time, providing input buffers within the global interface of each node which can store the maximum number of requests that any agent within that global interface can receive at any given time and transferring stored requests from the buffer as the node completes requests in process and is able to process additional incoming requests. For some architectures, the maximum size of the buffer could conceivably be somewhat less than the total number of transaction requests that could be simultaneously sent to any agent within a node, as the node could begin processing a certain number of the incoming transactions. However, for particular architectures, if all incoming requests affected the status of the same cache line, the transactions would have to be processed sequentially, one at a time. Although it is unlikely that all transactions would be related to a single cache line, the safest solution for these architectures is to size the buffers so that each can handle at least the maximum number of incoming requests that could possibly be sent simultaneously to its associated agent. In other words, the key to the invention is sizing the input buffers so that it impossible for them to overflow.

Referring once again to FIG. 5, the buffer which must be properly sized to prevent overflow are I/O request buffer 518, cache coherency request buffer 520, and R-T-O buffer 522, all of which feed header information to HA 502, and slave request buffer 526, which feeds header information to SA 504. For local node request transactions, cache-coherency input queue 534 and I/O input queue 538 should also be sized to prevent overflow.

As the request agent (RA) of each node may have only a certain finite number of requests pending at any one time, this is the maximum number of requests that can be received by a home or slave agent from the request agent of another node. In addition, the RA of each node may also issue requests that must be processed within its associated node. Therefore, the input buffer which feed both home agents and slave agents must be sized to accommodate not only external requests, but internal ones as well.

For the present implementation of the disclosed system, any node can have up to 16 requests outstanding at any time. Each outstanding request is monitored by a request state machine array 542 at the requesting node. Likewise, each home agents and each slave agent can process a maximum of 16 requests simultaneously. All incoming requests are also monitored by a state machine array associated with the receiving agent. Thus home agent 502 has a home state machine array 544 associated therewith, and slave agent 504 also may have a slave state machine array 546 associated therewith. When 16 requests are in the process of being satisfied by a particular home or slave agent, that agent has reached its full processing capacity and cannot begin processing other requests until at least one of the sixteen already-accepted requests has been fully processed.

In another embodiment of the invention, which relates to coherent-cache, multi-node, parallel computer systems which have an input/output (I/O) cache at each node, transactions destined to I/O devices are queued separated from transactions related to cache coherency, and the processing of cache coherency transactions is never required to wait for the processing of I/O-related transactions.

As can be seen the disclosed invention provides an effective method and apparatus for providing orderly flow of memory request transactions, without resorting to the implementation of complex transaction flow protocols. It should be clear that the invention is applicable to any cache-coherent computer system having multiple nodes, with each node having a portion of global memory and at least one cache-fronted processor.

Although only several embodiments of the invention have been disclosed herein, it will be obvious to those having ordinary skill in the art of parallel processing that modifications and changes may be made thereto without departing from the spirit and the scope of the invention as hereinafter claimed.

What is claimed is:

1. A multi-processor computer system comprising:
  a global interconnect;
  a plurality of n nodes, each node having:
    a local interconnect;
    at least one processor, said processor being coupled to the local interconnect;
    a cache associated with each processor;
    a main memory coupled to the local interconnect, said main memory being equally accessible to all processors within its respective node;
    a global interface which couples the global interconnect to the local interconnect of its respective node, said global interface including a transaction filter, a tag memory, home agent, a slave agent, and a request agent, said transaction filter routes cache coherency transactions from said local interconnect through a local physical address-to-global address translator to said request agent, said transaction filter routes input/output transactions from said local interconnect through an I/O input queue to said request agent, and said tag memory stores a permission status entry for each of said routed cache coherency transactions and said routed input/output transactions; and at least one input buffer associated with each home agent and each slave agent and forming a portion of said global interface, each input buffer associated with said each home agent and said each slave agent of each global interface of each of the plurality of n nodes sized to contain a number of storage locations corresponding to at least a maximum number of outstanding transaction requests receivable at each node of the plurality of nodes, the maximum number of outstanding transaction requests being the outstanding transaction requests together issuable by all of said plurality of n nodes.

2. The multi-processor computer system of claim 1, wherein each cache comprises a plurality of storage locations, each location sized to store data from an addressable portion of the main memory associated with any node.

3. The multi-processor computer system of claim 2, wherein a portion of the main memory associated with each node is set aside as a directory for cache lines stored within that node, said directory also providing status information for each cache line.

4. The multi-processor computer system of claim 3, wherein said status information identifies one of four data states: shared, owned, modified or invalid.

5. The multi-processor computer system of claim 1, wherein each exportable address location within main memory is associated with a data tag which identifies one of four data states: shared, owned, modified, or invalid.

6. The multi-processor computer system of claim 1, wherein each global interface further comprises a main memory address map for the entire system.

7. The multi-processor computer system of claim 1, wherein each global interface further comprises interface circuitry having a directory cache into which is loaded a sub-set of the node's directory.

8. The multi-processor computer system of claim 1, wherein each request agent has a state machine array associated therewith for monitoring the status of each request transaction that it issues.

9. The multi-processor computer system of claim 1, wherein each home agent has a state machine array associated therewith for monitoring the status of all requests for which it has undertaken processing.

10. The multi-processor computer system of claim 1, wherein each home agent has a first input buffer for storing cache-coherency transaction requests until they can be processed, a second input buffer for storing I/O requests until they can be processed, and a third input buffer for storing request-to-own requests until they can be processed.

11. In a multi-processor computer system having multiple nodes, each node having a block of main memory and multiple microprocessors, each node having a global interface which incorporates a home agent, a slave agent and a request agent, a method for providing the orderly flow of memory request and request compliance traffic between nodes without resorting to complex flow control protocol, said method comprising the steps of:

identifying a number y, which represents the maximum number of incomplete transaction requests that any single node may have outstanding, the number y limited to a certain, determinable finite number;

multiplying the number y by the number n, which represents the number of nodes within the computer system;

providing temporary storage at a buffer of the global interface for at least a number ny of requests at the home agent of each node so that pending requests received by that home agent may be stored until it is able to process them;

processing the requests stored at the temporary storage, provided during said step of providing, at the microprocessor;

maintaining a status indicator at each node for each received request once processing of that request begins;

indicating whether processing of the request is complete or still pending;

transferring stored requests as the requests stored during said step of providing are processed;

receiving cache coherency transactions and input/output transactions from the multiple microprocessors;

routing said cache coherency transactions through a local physical address-to-global address translator to the request agent;

routing said input/output transactions through an I/O input queue to the request agent; and storing a permission status entry for each of said routed cache coherency transactions and said routed input/output transactions.

12. The method of claim 11, wherein temporary storage at each node includes storage for requests internal to that node.

13. The method of claim 11, which further comprises the step of providing temporary storage for at least a number ny of requests at the slave agent of each node so that pending requests received by that slave agent may be stored until it is able to process them.

14. The method of claim 11, which further comprises the step of providing temporary storage for at least a number y of requests at the request agent of each node so that pending requests received from processors within that node may be stored until the request agent is able to process them and transmit them to that node's home agent.

15. The method of claim 11, wherein separate temporary storage is provided for incoming cache-coherency requests, I/O requests, and request-to-own requests.

16. The method of claim 11, which further comprises the step of providing temporary storage for requests received by the slave agent of each node so that pending requests received by that slave agent may be stored until it is able to process them, said temporary storage being sized such that it can never overflow.

17. The method of claim 11, which further comprises the step of providing temporary storage for requests received by the request agent from processors within that node so that such requests may be stored until the request agent is able to process them and transmit them to that node's home agent.

* * * * *